United States Patent [19]
Dalibout et al.

[11] 4,364,305
[45] Dec. 21, 1982

[54] BRAKE CYLINDER DEVICE COMBINING A PNEUMATICALLY-APPLIED SERVICE BRAKE AND A SPRING-APPLIED PARKING BRAKE

[75] Inventors: Georges Dalibout, Gagny; Michel Grenier, Dampmart, both of France

[73] Assignee: WABCO Westinghouse, S.A., Freinville-Sevran, France

[21] Appl. No.: 157,691

[22] Filed: Jun. 9, 1980

[51] Int. Cl.³ .............................................. F01B 7/00
[52] U.S. Cl. .......................................... 92/63; 92/29
[58] Field of Search ................ 92/29, 63, 65, 64, 129, 92/33, 130 A

[56] References Cited
U.S. PATENT DOCUMENTS

| 3,704,653 | 12/1972 | Higgins | 92/29 |
| 3,717,072 | 2/1973 | Kaltenthaler | 92/63 |
| 3,994,205 | 11/1976 | Ekdahl | 92/29 |
| 4,018,140 | 4/1977 | Engle | 92/130 A |
| 4,036,111 | 7/1977 | Dahlkvist | 92/29 |
| 4,080,876 | 3/1978 | Sturgess | 92/29 |

FOREIGN PATENT DOCUMENTS
2011416  2/1970  France .

Primary Examiner—Abraham Hershkovitz
Attorney, Agent, or Firm—G. J. Falce

[57] ABSTRACT

A brake cylinder device combining a pneumatically-applied service brake and a spring-applied parking brake in a compact unit made possible by limiting the stroke of the parking brake piston to minimize the expansion of the spring and thus the amount of force relaxation, so that a relatively small spring may be used. The service brake piston carries a threaded shaft on which a nut is rotatably carried for locking engagement with the parking brake piston. The position of this nut during service braking is maintained in a predetermined position in proximity with the parking brake piston, by reason of a back-up spring imparting rotation, as the service piston takes up slack in the brake rigging, so that when the parking brake is subsequently applied, by locking engagement with the nut following only a short stroke, the stored energy of the spring acting through the parking brake piston, the nut and screw end of the service piston, and the service piston itself, substantially full force of the constrained parking brake spring is effective.

6 Claims, 2 Drawing Figures

BRAKE CYLINDER DEVICE COMBINING A PNEUMATICALLY-APPLIED SERVICE BRAKE AND A SPRING-APPLIED PARKING BRAKE

BACKGROUND OF THE INVENTION

The present invention relates to a brake cylinder device having a service piston activated by fluid under pressure and a spring-applied parking brake piston (for parking and/or emergency braking) held in an unlocked position by the pressure of the fluid acting against the reaction force of the spring.

Spring-applied brakes are well known, especially braking devices having compressed air service brakes combined with spring brakes held released by compressed air pressure during operation of the vehicle. In addition to the risks of sudden application of spring brakes in case of rupture of the line feeding the spring brake piston, the principal drawback of these spring brakes, that otherwise present excellent compatibility with pneumatic service braking, rests in the fact that the reaction force of the spring that applies the parking or emergency brake rapidly diminishes as the spring expands. Inevitably, significant slack exists in the rigging due to flexure of the parts, as well as brake shoe-wheel wear, thus increasing the stroke of the parking brake piston and, consequently, the degree of expansion of the parking brake spring. It has been noted as well that, in numerous cases, after several years of spring brake service, the spring reaction force is diminished by the effect of corrosion and the creep of spring steel, when remaining under constraint for a period of time, so that, in braking position, only values between one-half and one-third of the initial maximum reaction force are realized.

SUMMARY OF THE INVENTION

One of the objects of the present invention is to better utilize the reaction force of a preconstrained spring used in a parking brake by maintaining the degree of spring expansion constant at a minimum value.

To this effect, the spring piston is capable of transmitting to the service piston all or part of the reaction force of the spring by the intermediary of a transmission surface carried by the spring piston and a receiving mechanism of the service piston. The transmission and receiving members are arranged to maintain the receiving mechanism against a stop that is supported by the cylinder body and, thus, is positioned on the service piston independently of the axial travel of the service piston, the position of the receiving mechanism against the stop being at a slight distance from the transmission surface, when the spring piston is in a release position under the action of release pressure. Accordingly, the axial travel of the spring piston, from its release position, and under the spring action, brings about contact of the transmission surface with a contact surface interconnected with the receiving mechanism, and the parking brake piston is then axially interlocked with the service brake piston, transmitting to it brake action corresponding substantially to the pre-stressed force of the parking brake spring, with but minimum loss of spring force.

According to one aspect of the invention, the receiving mechanism is a nut that is axially movable along a screw-threaded shaft of the service piston, while being held at a slight distance from this transmission surface formed on the parking piston. The transmission surface carried by the parking piston is interlocked against rotation in relation to the body of the cylinder by engagement with the contact surface formed on this receiving mechanism by interlocking means, such as conical surfaces and/or clutch teeth.

According to another aspect of the invention, a pushrod serving as a stop for positioning the receiving mechanism is capable, on the one hand, when the parking piston is in a release position, of itself being located by engagement with the cylinder body under action from a spring between the parking piston and pushrod, and, on the other hand, of being driven by a stop shoulder of the parking piston, when additional movement of this piston occurs in the brake application direction, following engagement thereof with the transmission surface of the receiving mechanism.

According to another aspect of the invention, the transmission surface that is carried by the parking piston is integral with a sleeve that turns freely in relation to this piston, but is locked against rotation in relation to the cylinder body by an intermediary clutch mechanism consisting of an interlocking gear having clutch teeth that cooperate with another gear that is locked against rotation with the cylinder body.

A manual release rod can be actuated to mechanically disengage the clutch and consequently provide for rotation of the sleeve, and accordingly the free rotation of the receiving mechanism on the threads of the service piston shaft that is subject to the reaction force of the brake rigging, so that manual release of the spring brake may be accomplished by the supply of fluid pressure to the parking brake piston.

The clutch effect between the two gears can be unidirectional to prevent rotation of the sleeve in the direction, assuring driving of the screw with reversible threads by the spring piston, while the teeth of at least one of the gears permits rotation of the sleeve in the other direction to allow release of the parking piston under the action of the release pressure.

According to a simplified version, the transmission and interlocking surface is provided directly or rigidly connected with the parking piston that is interlocked against rotation in relation to the cylinder body by any appropriate means, such as by splines.

When the brake cylinder, according to the invention, has an interlocking, remote control latch able to axially block, in relation to the cylinder body, an axial extension of the parking piston in released position, in order to keep this piston inactive after disappearance of the release pressure from the spring brake, and to free this piston to bring about parking/emergency braking, the axial extension can contain the stop pushrod spring and the part of that pushrod subject to the spring.

Other objects, advantages, and characteristics of the present invention will appear from the description that follows with regard to the drawing attached wherein.

DESCRIPTION AND OPERATION

Figure 1:
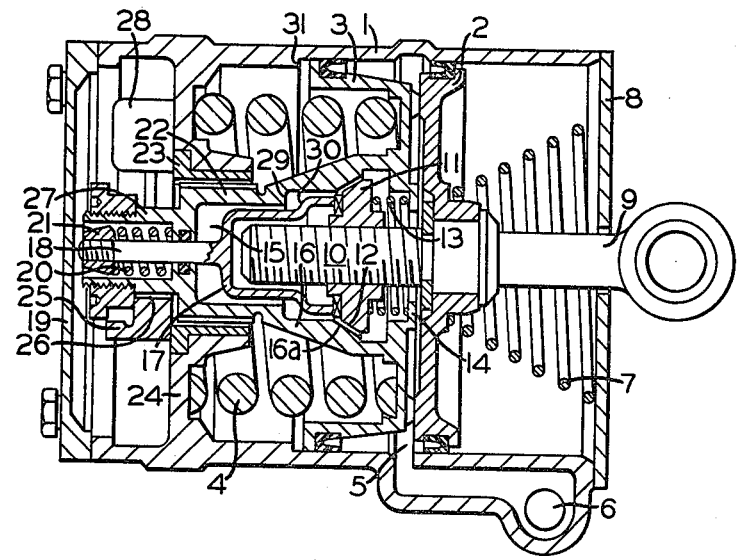
FIG. 1 is an axial cutaway view of the first embodiment of the invention.

FIG. 1 shows a brake cylinder of which the main body 1 contains a service piston 2 assigned to a service brake and a spring-applied parking piston 3 that is acted on in a brake application direction (right-hand) by a powerful, preconstrained spring 4. A fluid pressure chamber 5 formed between the two pistons is connected to a brake control valve (not shown) by a fitting 6. A release spring 7 is placed between the service piston 2 and a cover 8 that closes the body 1 on the right side.

The service piston 2 is connected with an output shaft 9 to which brake rigging (not shown) may be connected. On the side opposite the piston 2, the shaft 9 is prolonged by a shaft 10 with reversible threads on which a nut 11, having an external conical face 12, is screwed. The nut 11 is fixed in an axial position by intermediary stops, including springs and bearings. The stop on the right consists of a spring 13 positioned between the nut 11 and a spring seat 14 closing a chamber 15 of the central area in the form of a sleeve 16 of the spring piston 3. The stop on the left consists of a small sleeve 17 that acts against a bearing carried on nut 11.

The sleeve 17 is provided with a stop shaft 18 that is forced against an end cover 19, closing the left side of cylinder body 1, under action of a spring 20 positioned between the sleeve 16 of the spring piston and a retaining ring 21 screwed on the shaft 18. The sleeve 16 is formed with a splined ring 22 that encloses the stop shaft 18 and spring 20. The ring 22 is interconnected with a correspondingly splined bearing 23 fixed in a bore of a partition 24 of the cylinder body.

The chamber between the cover 19 and partition 24 houses latching means of the spring piston 3, including a transversal spring catch 25 cooperating, on the one part, with a tumbler 26 provided in a section 27 or ring 22 and, on the other part, with the piston rod activated by an electropneumatic cylinder 28.

The sleeve 16 has formed on the interior of chamber 15, an interlocking and transmission surface 16a having a conical shape and able to cooperate with the conical face 12 of nut 11 from which it is spaced a slight distance in release position of piston 3, as shown. The sleeve 16 of piston 3 also has an internal stop surface 29 adapted to engage a corresponding shoulder 30 of the small sleeve 17, from which it is normally spaced a distance greater than the slight distance cited above. The bore in which the piston 3 is disposed is provided with a shoulder 31 against which the spring piston 3 is seated under action of the pressure in chamber 5.

The device described in FIG. 1 functions as follows: In normal brake release operation of the vehicle, the movable pieces of the cylinder occupy positions as shown in FIG. 1. The chamber 5 is connected to the atmosphere, and the spring piston 3 is held in its release position at a slight distance from its stop 31 by the catch 25 that is clenched in the groove 26. The spring 4 is compressed, and the service brake piston 2 is held in a release position against the parking brake piston 3 by its release spring 7.

When the operator of a vehicle equipped with brake cylinders, according to the invention, decides to use the service brakes, he must deliver, via a suitable control valve device (not shown), compressed air into the chamber 5. The friction brake is then activated by the service piston 2 which is displaced toward the right, while the parking brake piston 3 remains inactive, but in reserve. Movement of piston 2 toward the right pulls rod 10 with it, such that the reversible threads bring about rotation of nut 11 between its bearing stops, due to the leftward-acting force action of the spring 13. The nut 11 freely turns to remain in a directionally fixed position in relation to the body 1, while maintaining continuous engagement with the small sleeve 17, so that the conical surfaces (12 and 16a) remain a slight distance from each other. To release the brakes, the pressure in chamber 5 is released and the service piston 2 is forced toward the left of FIG. 1, under the reaction effect of the brake rigging tension and spring 7. As the piston 2 moves toward the left, shaft 10 applies a force to nut 11 toward the left, and against the ball bearing stop positioned between this screw and the small sleeve 17, thus imparting rotation of nut 11 on the shaft 10, whereby nut 11 is maintained in a directionally fixed position in relation to the body 1.

For parking/emergency braking of the vehicle, service braking is used in a way that has just been explained by exerting maximum braking pressure, to bring about an emergency application of the brakes. Under the effect of maximum pressure thus obtained in chamber 5, the piston 3 becomes fully retracted until it engages back stop 31, which in turn frees the catch 25 from the axial friction force normally exerted on it under the force of spring 4, thus allowing the electrovalve of the electropneumatic cylinder 28 to push back the catch 25 toward the bottom of FIG. 1. The brake is then conditioned for park braking.

The spring piston 4, while still being held under tension by piston 3, is nevertheless ready to intervene in the braking action by transmitting its energy to piston 2. Indeed, if the feed conduit associated with fitting 6 shows a noticeable leak, the pressure in the chamber 5 will eventually fall below a value capable of withholding piston 3 against spring 4, and piston 3 is thus moved toward the right to bring the transmission surface (16a) in contact with the conical face 12 of the nut 11. This frictional engagement between conical faces (12, 16a) locks nut 11 against rotation and concurrently transmits the spring 4 force to the threaded shaft 10 via its intermediary reversible threads, following movement of piston 3 through only the slight axial distance existing between the transmission surface (16a) and the conical face 12 of the nut 11. In the course of this very slight expansion of spring 4, the reaction force of the spring diminishes very little. It is even possible to reduce the constraint of the spring 4 compressed in a permanent way in a stop on the catch 25. It suffices for that to choose a spring 4 of great length and smaller thread diameter and to compress this spring in spirals almost joining the cylinder assembly and the piston 3.

In this style of the invention, the axial bulk of the brake spring 4 is minimal because this spring remains compressed almost into a block, and extends only several millameters to assure parking/emergency braking directly substituting for service braking. The spring 4, of course, can be replaced by several parallel or concentric springs without changing the principle of the invention.

To release the brake in park, the maximum pressure must be resupplied to chamber 5. The piston 3 is forced back in contact with its stop 31 and ignites the electrovalve of the cylinder 28, so that once again the catch 25 can be engaged in groove 26 to axially interlock the spring piston 3. Concurrently, the conical surfaces 12 and 16a are separated, without rotation of nut 11, as the nut engages its stop provided by small sleeve 17, which itself engages cover 19 closing the left side of body 1. It should be noted that, if, for whatever reason (for example, cooling of the braked wheels in the course of a long period of parking), the piston 3 can effect a slight stroke, but nevertheless directionally toward the right to maintain application of the maximum parking/emergency braking force, the stop surface 29 engages shoulder 30 of the small sleeve 17 and drives it toward the right against spring 20, while being held at a distance from nut 11, which follows the movement of the piston 3 toward the right. To terminate the release of the park braking, the operator of the vehicle releases pressure from chamber 5. Under the reaction forces of the rigging and spring 7, the piston rod 9 and its piston 2 are forced toward the left of FIG. 1 and, as for release of the service brake, shaft 10, in moving toward the left, imparts rotation of nut 11 which is constantly held in its set position a slight distance from conical surface 16a.

Figure 2:
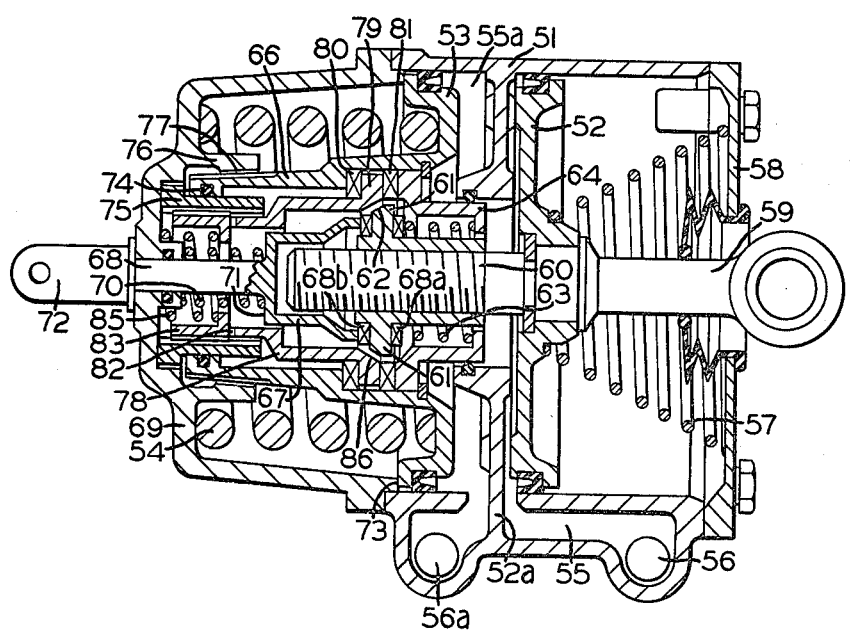
FIG. 2 is a similar view of a second embodiment.

FIG. 2 shows a brake cylinder 51 having a main body that contains a service piston 52 and a parking piston 53 pushed back toward the right of the figure by a spring 54. An internal chamber 55 formed by the piston 52 and a partition 52a is connected by a fitting 56 to a control valve (not shown) for command of the service brake. A second internal chamber 55a, formed by the partition 52a and the parking piston 53, is fed fluid under pressure from a fitting 56a. A return spring 57 is positioned between the service piston 52 and a cover 58 closing the body 51 on the right side.

The service piston 52 is rigidly connected to an output shaft 59 arranged to be connected to brake rigging (not shown). On the side opposite piston 52, shaft 59 is extended by a rod 60 with reversible threads, on which is screwed a nut 61 having an external conical face. As with nut 11, the nut 61 is held in an axial directionally-fixed position by the intermediary of two bearing members acted on by the flexible stops. The right stop consists of a spring 63 positioned between a bearing 68a and a spring seat 64 that is connected to the spring piston 53 and that fits across the partition 52a to close the chamber 55 formed by the central part in the shape of a sleeve 66 of the parking piston 53. The flexible stop on the left consists of a small sleeve 67 that engages an intermediary bearing 68b of nut 61. The small sleeve 67 is extended on the left by a shaft 68 that passes through a sealed bore of a cover 69 closing the cylinder body 51 on the left side. A release spring 70 positioned between the cover 69 and a shoulder 71 of the small sleeve 67 urges the small sleeve in a right-hand direction. The shaft 68 is formed with a cap 72 on the outside of the cover 69. Piston 53 is centered on the cylinder body by a stop shoulder 73 and compresses the spring 54. The sleeve 66 of the spring piston 53 can run along the outer periphery of a ring 75 without leakage due to a seal 74 of ring 75. This sleeve 66 is connected to the cover 69 with the help of an internal annular projection 76 of this cover, having splines 77, cooperating with corresponding splines of the sleeve 66.

Between the sleeves 66 and 67 is placed a rotatable sleeve 78 centered on its left side to the interior of ring 75 and on its right side to the interior of sleeve 66 with an intermediary small collar 79 held axially between the sleeve 66 and the spring seat 64 via two bearing members 80 and 81. The face on the left side of sleeve 78, connected to the interior of ring 75, carries clutch teeth 82 that cooperate with corresponding teeth on a gear 83 having a spline connection with the interior of ring 75 under the urging of a spring 85.

The sleeve 78 has, on its interior, at the level of its collar 79, a conical surface 86 for engagement with the conical face 62 of nut 61.

The clutch between the teeth 82 of sleeve 78 and those of the gear 83 under the action of the spring 85 is unidirectional in the direction assuring the driving of nut 61 by the parking piston 53, but the teeth with two faces (right face and inclined face) of at least one of the gears permits the rotation of the sleeve 78 in the other direction to allow the nut 61 to turn and reset the parking brake piston.

The device described in FIG. 2 functions in the following manner. In normal service on a moving vehicle, the fitting 56 is connected to the atmosphere, while fluid pressure introduced into the chamber 55a via fitting 56a pushes piston 53 back against the shoulder 73 in opposition to the reaction force of spring 54. The sleeve 66 of spring piston 53 keeps the interior sleeve 78 toward the left, by reason of the ball bearing stops 80 and 81, and thus maintains the interior conical surface 86 carried by this sleeve 78 at a distance from conical face 62.

To assure service braking, the fitting 56 is fed by fluid pressure while the fitting 56a remains under pressure. Under the action of the service brake pressure in the chamber 55, piston 52 moves toward the right, concurrently pulling shaft 60 axially, as in FIG. 1, to impart rotation of nut 61 between its bearings 68a and 68b. The unlocking of the service brake is effected in the same manner as for FIG. 1.

Park braking is assured in the following manner. The operator of the vehicle applies service brakes in accordance with the maximum pressure in the service chamber 55, then releases the pressure from chamber 55a of the parking brake.

The piston 53 is then moved toward the right under action of spring 54, pulling sleeve 78 and its conical surface 86 with it. The splined gear 83 keeps its teeth in contact with the teeth 82 of sleeve 78 by reason of spring 85 urging gear 83 toward the right, thereby preventing rotation of sleeve 78 in relation to the body 51 of the cylinder via intermediary splines of ring 75 connected to the cover 69.

The nut 61 is in turn driven toward the right, when the conical faces 62 and 86 come in contact. The sleeve 78, locked against rotation in relation to the body 51, in turn, locks nuts 61 against rotation. The shaft 60 is thus pushed toward the right by parking piston 53, without this piston 53 running the normal locking stroke already effected by the piston 52. The parking piston stroke 53 is equal to the axial play between the conical faces 62 and 86.

To limit the braking force on shaft 59, the driver can then release some of the pressure from chamber 55 via fitting 56. The brake cylinder 51 assures park braking by reason of piston 52 being pushed by the single spring 54 of the parking piston 53. Different from FIG. 1, the fluid-pressure-applied service brake forces and spring-applied parking brake forces can be separated or added to according to need.

Release of the parking brake is obtained by the operator of the vehicle putting back fluid pressure in chamber 55a via the fitting 56a independently from the pressure in the service chamber 55.

Manual release of the emergency brake is possible, for example, to move a vehicle from a shop, when no compressed fluid is available to pressurize chamber 55a via fitting 56a.

This release is obtained by manually operating cap 72 toward the left of FIG. 2. The shoulder 71 of sleeve 67 moves leftward toward gear 83 and upon contact, disengages the clutch action between gear 83 and sleeve 78, so that sleeve 78 can then turn with nut 61 on the reversible threads of shaft 60. The spring 54 forces piston 53 toward the right until it stops against the median partition 52a of cylinder body 51. At the same time, the reaction force exerted toward the left on the shaft 59 pushes the shaft 60 back toward the left, causing rotation of nut 61 and the sleeve 78 that is connected to it, thereby cancelling the application force of the brakes exerted by parking piston 53 acting through service piston 52, and allowing the service piston to be moved back to its release position by its return spring 57, such as shown in FIG. 2.

The automatic resetting of the spring brake after manual release is obtained in the following manner. The fitting 56a is supplied with fluid under pressure to pressurize chamber 55a. The piston 53 is then pushed back toward the left until it engages stop 73, thereby compressing spring 54, while bringing the sleeve 78 and gear 83 back toward their original positions shown on the drawing. The nut 61 is separated from sleeve 78 and pushed by the spring 63, so as to rotate on the shaft 60 and accordingly move axially toward the left. The clutch action between the sleeve 78 and the gear 83 is inoperable in this direction of rotation of the nut 61, so that sleeve 78 can turn several teeth in relation to the gear 83 if necessary. The nut finally comes to rest against its stop provided by the small sleeve 67 in set position to reset the parking brake.

The present device can function as an emergency brake in the case of insufficient service braking. The release of pressure from the chamber 55a allows operation of the spring brake, the force of which is added to that of the service brake.

Of course, the present invention is not limited to the contents of the description above and it is capable of numerous modifications and variations without deviating from the idea behind the invention.

Thus, several parallel springs can be used or concentric springs in place of the single spring 4 or 54, and these springs can, as opposed to those usually used for spring brakes, present reaction forces that do not linearly decrease with the spring expansion, but decrease, for example, as the square of the length of compression of the spring. The springs shown can be replaced by preconstrained elastomeric blocks on the spring piston assembly or of the cover at the base of the spring cylinder such as cover 69.

This usage of inexpensive springs with great power and slight play is rendered possible by the slight application stroke of the brakes that follow the spring piston before complete application of the spring brake, due to complete recapturing of the play and the flexible stroke effected by the service brake piston before application of the spring brake.

The service brake piston 52 can also be suppressed on FIG. 2 and only the parking brake considered. In such a spring brake, the piston 53 should then effect the whole application course of the brake, with the cap 72 allowing manual release of the brake with automatic resetting of the nut 61 after resupplying pressure to chamber 55a. In suppressing piston 52, a mechanism is thus obtained that is destined to manually interrupt and automatically reset the transmission device for uniaxial force especially for spring brakes having in a body, a cylinder with fluid, a piston, a pushrod, a spring carried on the first face of the piston and making it go forward to lock the brakes when fluid pressure exerted on the second face of the piston in the cylinder diminishes, and a transmission device mounted between the piston and the pushrod to move the pushrod when the piston advances, this device being able, on the one hand, to be freed in a manner to allow the pushrod to come back alone toward the piston, and on the other hand, to automatically come back before the piston after the return of the piston to an inactive position, the transmission device having a reversible thread nut screwed on a corresponding threaded section of the pushrod and connected to the piston via two axial spans with slight friction, the said nut being connected, via intermediary cleats keeping this screw from turning in the direction of the transmission force and able to be unfastened from the exterior, with a transmission device element immobilized in rotation, characterized by cleats which are mounted between, on the one hand, a receiving gear connected to a screw in rotation, and, on the other hand, a command gear fixed in rotation in relation to the body of the transmission device to be applied against the receiving gear by an application spring, while being capable of being axially recalled to the opposite of this spring by a manual unlocking device on the outside.

The brake cylinder, according to the invention, allows protection against sudden release of the spring brake. For that, the spring piston stroke before engaging the cylinder body should be limited to a value less than that necessary to maintain maximum force applied for parking/emergency brakes already applied by the service brake and/or to effect a flexible application stroke of a possible supplement in brake force, in such a way as to not provoke brake action of the spring brake piston in cases of sudden release of this spring brake when the service brake is not activated. To keep the spring brake inactive after its sudden release, and in the course of activating the service brake, the final stroke of the spring piston before backing the cylinder body provokes the permanent and automatic liberation of the cleats.

Having now described the invention, what we claim as new and desire to secure by Letters Patent, is:

1. A brake cylinder device comprising:
(a) an auxiliary brake piston subject on one side to the force of fluid pressure urging movement of said auxiliary brake piston in a brake release direction;
(b) a parking brake spring acting on the side of said auxiliary brake piston opposite said one side to urge movement of said auxiliary brake piston in a brake application direction;
(c) a service brake piston subject on one side thereof to the force of fluid pressure urging movement of said service brake piston in said brake application direction;
(d) a screw-threaded shaft projecting from said service piston in the direction of said auxiliary piston;
(e) a nut rotatably disposed on said shaft and having a force receiving surface; and
(f) a sleeve member comprising:
  (i) a collar at one end supported between a pair of bearing members of said auxiliary piston, whereby said sleeve member is rotatable relative to said auxiliary piston;
  (ii) a force transmitting surface normally spaced a predetermined distance apart from said force receiving surface and engageable therewith upon axial movement of said auxiliary brake piston in said brake application direction by said predetermined distance relative to said service brake piston to lock said nut against rotation, whereby the force of said parking brake spring is transmitted to said service brake piston; and
  (iii) clutch teeth arranged about one end of said sleeve member;
(g) an annular ring member secured to the end body of said brake cylinder device, said annular ring member having axially arranged splines along the internal surface thereof;

(h) a gear member having an annular external surface arranged with axial splines for engagement with the splines of said annular ring member so as to provide axial relative movement thereto, said gear member having an end face formed with clutch teeth adjacent said clutch teeth at said one end of said sleeve member;

(i) a spring acting against said gear member to effect engagement between said clutch teeth of said gear member and said sleeve member to thereby prevent rotation of said sleeve member and accordingly cause said locking of said nut against rotation during said engagement of said force transmitting and receiving surfaces; and (j) means for establishing and maintaining said force transmitting and receiving surfaces apart by said predetermined distance during displacement of said service brake piston prior to said movement of said auxiliary brake piston, whereby the degree of expansion of said parking brake spring during movement of said auxiliary brake piston said predetermined distance relative to said service brake piston is constant, thus rendering the force characteristic of said parking brake spring constant irrespective of the stroke of said service brake piston.

2. A brake cylinder device, as recited in claim 1, wherein said means for maintaining said transmitting and receiving surfaces said predetermined distance apart comprises:

(a) a bias spring between said nut and a flange of said auxiliary piston to urge said nut in a direction to impart rotation thereof, whereby said force receiving surface of said nut is displaced in the direction of said force transmitting surface of said auxiliary piston; and (b) a stop member having a fixed position, to limit the degree of axial movement of said nut on said shaft by said bias spring, to thereby establish said predetermined distance between said force transmitting and receiving surfaces.

3. A brake cylinder device, as recited in claim 1, further comprising a portion formed by the body of said brake cylinder device and interposed between said auxiliary and service brake pistons to cooperatively establish therebetween a first pressure chamber and a second pressure chamber, respectively, said fluid pressure of said first chamber acting on said auxiliary piston in said brake release direction and said fluid pressure of said second chamber acting on said service piston in said brake application direction.

4. A brake cylinder device, as recited in claim 1, further comprising a service brake return spring acting on said service brake piston to urge movement thereof in said brake release direction.

5. A brake cylinder device, as recited in claim 1, further comprising manual release means operable to apply an axial force to said end face of said gear member, so as to displace said gear member axially and thereby disengage said clutch teeth between said gear member and said sleeve portion, to accordingly permit rotation thereof relative to said auxiliary piston.

6. A brake cylinder device, as recited in claim 5, further characterized in that said clutch teeth of one of said gear member and said sleeve portion is formed to disengage said teeth of the other of said gear member and sleeve portion in one direction of rotation of said nut and consequently said sleeve portion by movement of said auxiliary piston in said release direction.

* * * * *